INVENTOR.
EDGAR J. RUOF

Oct. 14, 1969　　　　　E. J. RUOF　　　　3,473,120
APPARATUS FOR DETECTING THE RATE OF WHEEL
　　　　　　　　ACCELERATION OR DECELERATION
Filed Jan. 3, 1967　　　　　　　　　　2 Sheets-Sheet 2
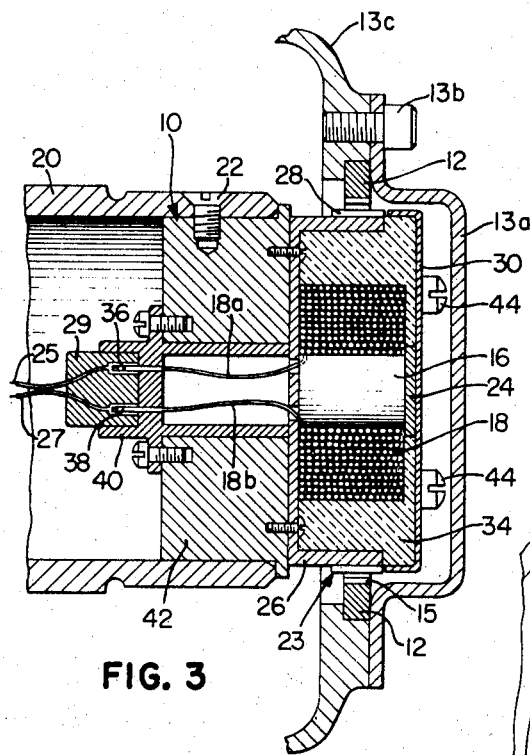
INVENTOR.
EDGAR J. RUOF
BY
Oldham & Oldham
ATTORNEY

United States Patent Office 3,473,120
Patented Oct. 14, 1969

3,473,120
APPARATUS FOR DETECTING THE RATE OF WHEEL ACCELERATION OR DECELERATION
Edgar J. Ruof, Akron, Ohio, assignor to The Goodyear Tire & Rubber Company, Akron, Ohio, a corporation of Ohio
Filed Jan. 3, 1967, Ser. No. 606,667
Int. Cl. G01r 11/06
U.S. Cl. 324—70                                    7 Claims

ABSTRACT OF THE DISCLOSURE

An electrical system to sense the rate of wheel acceleration or deceleration utilizing a magnetic transducer mounted to the axle which is totally enclosed and potted. The periphery of the transducer includes at least four poles which alternate north to south, at no greater than 90° spaced intervals whereby each pole may have from one to several teeth spaced to match the teeth of a rotating ring so that the flux path of the permanent magnet passing through the poles will be from the north poles into the ring and back into the south poles so that regardless of eccentricity or wobble, the ring will always be close to one of the poles and a good signal will be produced.

PRIOR ART

Heretofore, it has been known that there have been many and various types of electrical anti-skid systems for vehicle wheel brakes, and particularly for aircraft. For each of these systems to function, there must be some indication of wheel revolution so as to indicate when a skid situation is developing. Some prior art methods have attempted to utilize exciter rings with transducers to indicate by a frequency measurement the speed of rotation of the wheel. For example, U.S. Patent No. 3,017,145 teaches utilization of an electrical generator adapted for sensing wheel rotation which utilizes permanent magnets and a pole relationship to obtain frequency. U.S. Patent No. 3,233,946 teaches utilization of a proximity coil with pole pieces to measure wheel rotation. However, each of these structural applications is subject to variation in the signal produced because of possible eccentricity of the pole relationships to each other, or wheel wobble which is very difficult to avoid. The variations in clearance then between the transducer and the ring results in variations in signal amplitude and frequency which very greatly effects the performance of any anti-skid system. Further, these prior art systems are expensive to manufacture and are open and thus subject to weather and outside elements which cause failure.

Therefore, it is the general object of the present invention to avoid and overcome the foregoing and other difficulties of and objections to prior art practices by the provisions of a coil wound on a small round bar magnet with pole pieces placed across each end of the magnet so that the periphery of the transducer has a plurality of pole ends of an even number greater than two, each pole end with several teeth in a spaced relationship to match the teeth of an exciter ring, which structure will provide a good signal regardless of an eccentricity or wobble as the ring will always be in close proximity to at least one of the poles.

A further object of the invention is to provide an apparatus so that the periphery of the transducer shows four poles which alternate north, south, north, south at approximately 90° spaced intervals where each pole may have from one to several teeth spaced to match the teeth of a rotating ring so that the flux path of the permanent magnet passing through the poles will be from the north poles into the ring and back into the south poles so that regardless of eccentricity or wobble, the ring will always be close to one of the poles, and a good signal will be produced.

A further object of the invention is to provide an electrical wheel revolution sensor which is potted and with no moving or electrical parts exposed to the atmosphere or weather conditions.

The aforesaid objects of the invention and other objects which will become apparent as the description proceeds are achieved by providing in an apparatus for detecting the rate of wheel acceleration or deceleration the combination of a fixed axle, a wheel rotatably mounted to the axle, a small bar magnet mounted in fixed relation to the axle, a plurality of pole pieces positioned across the ends of the bar magnet so as to be in substantially equally spaced relation to each other whereby the ends of the pole pieces alternate in polarity and are in close proximity to the wheel, a ring mounted in fixed relation to the wheel on the inner periphery thereof and aligned with and in closely spaced relation to the ends of the pole pieces whereby the lines of flux from the bar magnet can pass from one pole piece through the ring and into the adjacent pole pieces, and where each end of the pole pieces and the ring have raised teeth of substantially the same number per inch, and a coil surrounding the bar magnet to detect the changes in flux flow.

For a better understanding of the invention, reference should be had to the accompanying drawings wherein:

FIGURE 2 is an end elevational view of a wheel showing the arrangement of the apparatus of the invention relative thereto;

FIGURE 3 is an enlarged partially broken away cross sectional view of the pole pieces and the exciter ring with the coil taken on line 3—3 of FIGURE 2; and FIGURE 4 is an electrical schematic illustration of the converter of the invention which changes the AC current produced by the transducer of FIGURES 1 to 3 into a DC output.

Figure 1:
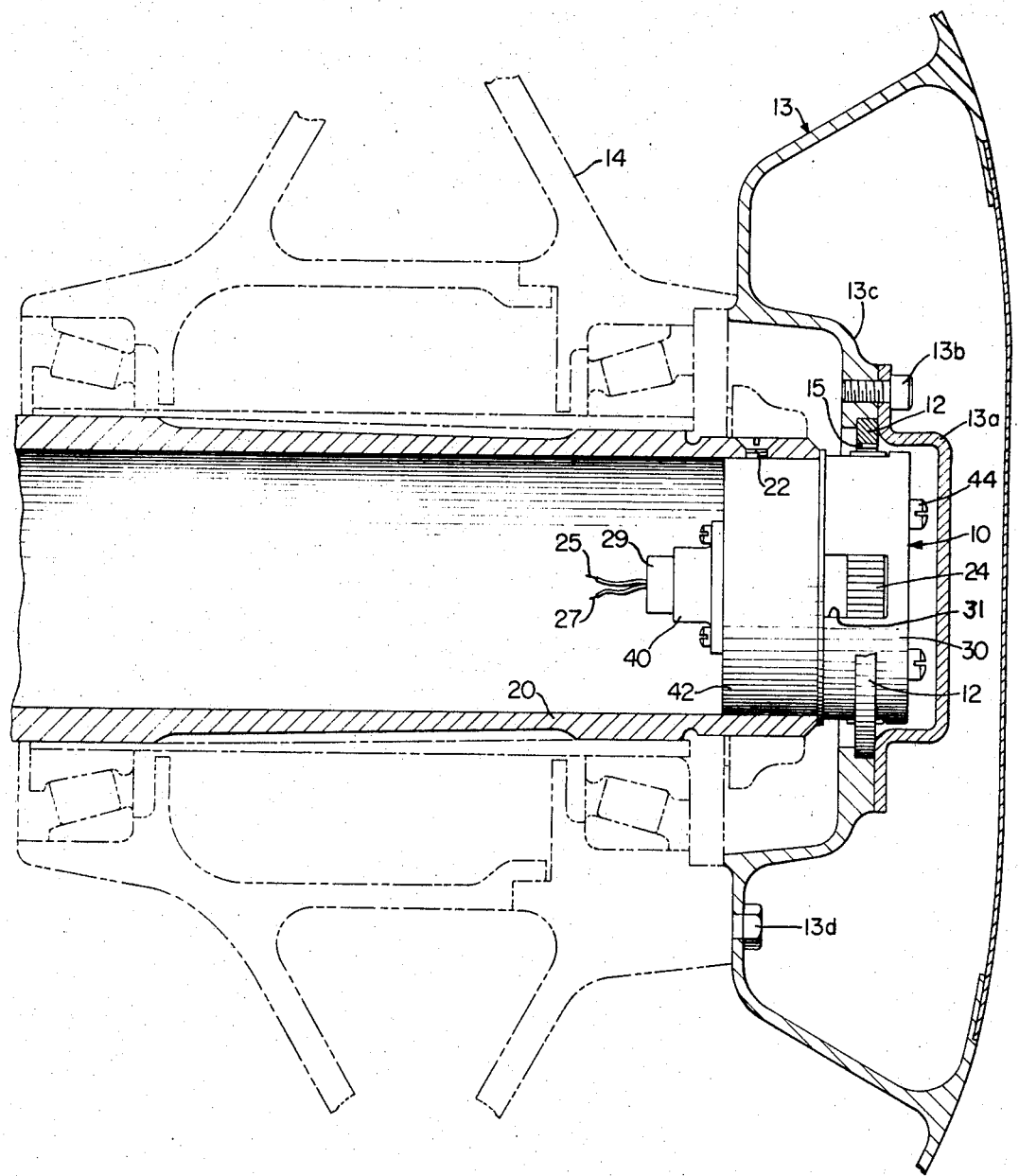
FIGURE 1 is a cross-sectional side elevation of an axle and wheel combination including the transducer apparatus of the invention.

In essence, any anti-skid system is comprised of wheel-speed sensors, the brake control valves, and the valve control circuitry. The invention disclosed herein is concerned with the wheel-speed sensor. In the instant case, the wheel-speed sensor is a magneto-electric pulse generator, which is made up of a transducer, indicated generally by the numeral 10, as seen in FIGURE 1, and an exciter ring 12 mounted in fixed relationship to a hub cap assembly 13 which consists of a transducer cover 13a fastened with bolts 13b to a wheel cover 13c which in turn is mounted by bolts 13d to a rotating wheel 14. Normally, the invention contemplates that the exciter ring 12 is a ferrous true circularly shaped ring normally held in position on the internal periphery of the hub cap assembly 13. It has a plurality of raised gear-like teeth 15 on its internal circumferential surface, and for the purposes for which the invention was conceived, 72 internal teeth were utilized. An alternative to mounting the exciter ring to the hub cap would be to mount it directly to the wheel. In any event, it rotates with the wheel.

As best seen in FIGURE 2, the transducer 10 contains a short round bar magnet 16 and a wound coil 18 surrounding it. It is mounted in fixed relationship to an axle 20 by a plurality of bolts 22. A plurality of poles indicated generally by the numeral 23, are formed in equal spaced relation and alternate polarity around the magnet 16. The invention contemplates that there will be at least four poles, but that any even number will be satisfactory as long as the polarity of the poles is alternately north—south, north, etc., around the circumference of the transducer. In the embodiment disclosed, the poles of the transducer are formed by two substantially U-shaped pole members 24 and 26, one mounted to the north end of the magnet 16 and the other to the south end of the magnet, as very clearly shown in FIGURES 2 and 3. To provide equal spacing, the pole members 24 and 26 are mounted at right angles to each other and have the U-shaped legs extending in parallel very closely spaced adjacent relationship to the ring 12. Each end of the poles have their own set of gear-like teeth, indicated generally by the numeral 28 which are identical in size spacing to those teeth on the ring 12. Best results seem to occur with a plurality of teeth on each pole, this normally meaning at least two teeth. Thus, the pole pieces form respective north, south, north, south poles at approximately 90° spaced relationship to each other around the internal peripheral surface of the ring 12. Since the soft-iron exciter ring 12 has 72 internal teeth as it rotates around the transducer, 72 cycles of AC voltage will be developed in the transducer coil 18 for each rotation of the exciter ring. In the structure provided, the periphery of the transducer has the four equally spaced poles, with each pole having six teeth angularly spaced to match the spacing of the teeth in the exciter ring. There is an average radial clearance or air gap of about .027 inch between the internal diameter of the exciter ring 12, and the outer diameter at the end of each pole, although this might vary between about .001 to about .250 inch.

Thus, it should be understood that the speed sensor is a magnetoelectric device which develops an EMF in its coil 18 in accordance with the principle of Lenz's law. As the exciter ring rotates around the transducer, the reluctance of the magnetic circuit is alternately increased and decreased by the alternative alignment and misalignment of the teeth of the ring with the teeth of the poles. This change in reluctance causes a change in flux, and the change in flux produces an EMF to be developed in the coil. This EMF is taken off over leads 25 and 27 which are connected by a plug 29 to the wires coming from the coil 18. The functional parts of the transducer, which are the magnet 16, the coil 18, and the pole pieces 24 and 26, are mounted in an aluminum housing 30. A window 31 as best seen in FIGURE 1 is provided to expose the teeth of the poles 23. The whole assembly is potted as indicated at 34 to eliminate moisture problems and to give greater vibration protection. The invention also contemplates that the valleys between the teeth of the poles 23 and the exciter ring 12 will be potted so that smooth continuous surfaces are present. This eliminates air flow problems and facilitates cleaning. An adapter ring 42 secured to the housing 30 by bolts 44 actually mounts the transducer in the hollow axle 20 by bolts 22.

The axis of the magnet 16 is concentric with the axis of the axle 20. The coil 18 is located on the magnet, and the two ends of the coil 18a and 18b are brought to pins 36 and 38 of a connector 40. Each of the two soft-iron pole pieces is located across an end of the magnet in such a way that the major dimension of the pole pieces spans the diameter of the transducer and is perpendicular to the axis of the magnet 16. Naturally, any number of pole pieces could be utilized to create as many poles of alternating polarity as desired. With more poles a smoother signal is obtained with less fluctuation.

For an understanding of the converter which receives the alternating current pulses from the transducer 10, reference should be had to FIGURE 4. Specifically, this circuit produces a DC voltage that is directly proportional to the frequency of the pulses developed in the transducer 10. The pulses from the transducer are coupled through capacitor C11 to the base of the transistor Q18. Transistors Q18 and Q19 amplify and square these pulses, as indicated by the pulse shown by the numeral 60, so that the resulting wave shape at the collector of the transistor Q19 is a square wave of 16 volts amplitude. Actually, the voltage at the collector is not a perfect square wave because on the half cycle when the transistor Q19 is cut off, the time constant of the resistor R45 and the capacitor series C12–C13 combination causes the leading edge of the square wave to have an exponential rise with an RC time constant of about 60 microseconds.

Capacitor C12 and diode CR37 and the other associated components therewith form a storage counter circuit which develops a DC voltage at the emitter of the transistor Q22 that is proportional to the frequency of the square wave. A resistor R50 is adjusted so as to provide the proper discharge rate for the capacitor C13, and thus it provides the means of calibration for obtaining a specific DC output for a specific input frequency. In the case of this specific anti-skid system, the output voltage should be 10 volts at an input frequency of one thousand cycles per second which is the transducer frequency at 100 miles per hour. The wave form indicated by the numeral 62 represents the DC output from the emitter of the transistor Q22.

Thus, it should be understood that the objects of the invention have been achieved by providing a specific transducer exciter ring combination which may easily be incorporated in any aircraft wheel to overcome wobble and eccentric problems associated with conventional transducers for this purpose, and also to provide by potting the complete elimination of moving parts as well as moisture and vibration problems, together with a simple, but highly reliable AC to DC converter.

While in accordance with the patent statutes only one best known embodiment of the invention has been illustrated and described in detail, it is to be understood that various modifications may be made to still fall within the objects of the invention.

What is claimed is:

1. In an apparatus for detecting the rate of wheel acceleration or deceleration the combination of
   a fixed axle,
   a wheel rotatably mounted to the axle,
   a small bar magnet mounted in axial alignment with and in fixed relationship to the axle,
   a plurality of pole pieces positioned in substantial perpendicular relation across the ends of the bar magnet so as to be in substantially equally spaced circumferential relation to each other whereby the ends of the pole pieces alternate in polarity are not more than 90° apart, and are in close proximity to the wheel,
   a ring mounted in fixed relation to the wheel on the inner periphery thereof and having a plurality of raised teeth aligned with and in close spaced relation to the ends of the pole pieces whereby the lines of flux from the bar magnet can pass from one pole piece through the raised teeth of the ring and into the adjacent pole pieces, and
   a coil surrounding the bar magnet to detect the changes in flux flow as an electrical AC signal.

2. An apparatus according to claim 1 where the pole pieces are substantially U-shaped with the center of the bottom of each pole piece attached to its respective end of the bar magnet and the other ends aligned in a substantially parallel relationship to the inner periphery of the ring, and further where both the internal periphery of the ring and the external ends of the pole pieces have a plurality of raised teeth of the same size and spaced relationship.

3. An apparatus according to claim 2 where the air gap spacing between the teeth of the ring and the teeth of the pole pieces is between .001 inch to .250 inch.

4. An apparatus according to claim 3 which includes a hub cap adapted to be removably positioned in fixed relation to the wheel, wherein the ring is mounted in fixed relation to the hub cap.

5. An apparatus according to claim 1 where the bar magnet, pole pieces and coil constitute a transducer, and where the combination includes a housing surrounding all the apparatus of the transducer which housing is mounted in fixed relation to the axle, and wherein all the components of the transducer are potted in the housing.

6. An apparatus according to claim 5 which includes a converter circuit to convert the AC signal to a DC signal and a removable plug connects the coil to the converter circuit.

7. An apparatus according to claim 2 which includes a housing surrounding the pole pieces, magnet and coil, potting filling the remainder of the housing and potting in the spaces between the teeth of the pole pieces and ring so that these surfaces are smooth and continuous to eliminate air turbulence and facilitate cleaning.

References Cited

UNITED STATES PATENTS

| | | | |
|---|---|---|---|
| 1,898,728 | 2/1933 | Huff | 324—70 |
| 2,104,707 | 1/1938 | Rawlings | 310—66 |
| 2,651,734 | 9/1953 | Field | 310—155 |
| 2,669,669 | 2/1954 | Spaulding | 324—70 |
| 2,760,093 | 8/1956 | Button | 310—155 |
| 2,931,929 | 4/1960 | Snowdon | 310—156 |
| 2,947,502 | 8/1960 | Highley | 324—70 |
| 3,077,549 | 2/1963 | Zelina | 310—155 |
| 3,260,555 | 7/1966 | Packer | 324—69 |

RUDOLPH V. ROLINEC, Primary Examiner

M. J. LYNCH, Assistant Examiner

U.S. Cl. X.R.

310—66, 155